(12) United States Patent
Sartori et al.

(10) Patent No.: US 10,939,528 B2
(45) Date of Patent: Mar. 2, 2021

(54) ELECTRONIC CIRCUIT WITH AN LED MODULE

(71) Applicant: Infineon Technologies AG, Neubiberg (DE)

(72) Inventors: Damiano Sartori, Padua (IT); Fabrizio Cortigiani, di Vigonza (IT); Marco Pamato, Schio (IT); Gernot Unterweger, Latschach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/566,768

(22) Filed: Sep. 10, 2019

(65) Prior Publication Data
US 2020/0092962 A1    Mar. 19, 2020

(30) Foreign Application Priority Data
Sep. 17, 2018   (DE) .......................... 102018122649.7

(51) Int. Cl.
*H05B 45/50*    (2020.01)
*H02H 3/06*    (2006.01)
(Continued)

(52) U.S. Cl.
CPC ............... *H05B 45/50* (2020.01); *H02H 3/00* (2013.01); *H02H 3/06* (2013.01); *H02H 3/066* (2013.01); *H02H 3/07* (2013.01)

(58) Field of Classification Search
CPC ........ H05B 45/50; H05B 45/52; H05B 45/54; H05B 45/58; H02H 3/066; H02H 3/06; H02H 3/07; H02H 3/00
See application file for complete search history.

(56) References Cited

U.S. PATENT DOCUMENTS 9,502,958 B2    11/2016   Pamato et al.
2005/0174420 A1*    8/2005   Hayashi ................. H05B 45/58
                                                           347/130
(Continued)

FOREIGN PATENT DOCUMENTS

DE    102009017989 A1    10/2010
DE    102016101549 A1    8/2016
(Continued)

*Primary Examiner* — Renan Luque
(74) *Attorney, Agent, or Firm* — Shumaker & Sieffert, P.A.

(57) ABSTRACT

An electronic circuit and a method are disclosed. The electronic circuit includes an LED circuit, wherein the LED circuit (1) includes: an input (11, 12) configured to receive an input voltage ($V_{IN}$); a drive circuit (2A) connected to the input (11, 12); and an LED module (3A) connected to the drive circuit (2A) and comprising an LED string ($4_1$) with at least one LED. The drive circuit (2A) is configured to monitor the LED module (3A) for the occurrence of an LED short in the LED string ($4_1$) and to change from a normal mode to a defect mode upon detection of the LED short, and the drive circuit (2A) is configured, in the defect mode, to operate the LED string ($4_1$) in at least one defect cycle that includes deactivating the LED string ($4_1$) for a deactivation period, activating the LED string for an activation period, and checking for the persistence of the LED short in the activation period.

22 Claims, 10 Drawing Sheets

(51) Int. Cl.
*H02H 3/07* (2006.01)
*H02H 3/00* (2006.01)

(56) References Cited

U.S. PATENT DOCUMENTS

| | | | | |
|---|---|---|---|---|
| 2011/0089855 A1* | 4/2011 | Roberts | .................. | H05B 45/58 |
| | | | | 315/291 |
| 2011/0169424 A1* | 7/2011 | Aboulnaga | ............ | H05B 45/50 |
| | | | | 315/297 |
| 2012/0056868 A1* | 3/2012 | Verschuren | .......... | G09G 3/3208 |
| | | | | 345/212 |
| 2012/0119898 A1* | 5/2012 | Shank | .................... | H05B 47/21 |
| | | | | 340/458 |
| 2013/0307416 A1* | 11/2013 | Xu | ......................... | H05B 45/50 |
| | | | | 315/122 |
| 2014/0160802 A1* | 6/2014 | Zhang | .................... | H02M 1/32 |
| | | | | 363/21.01 |
| 2015/0028772 A1* | 1/2015 | Konishi | ................. | H05B 45/60 |
| | | | | 315/297 |
| 2018/0132313 A1* | 5/2018 | Kuang | ................... | H05B 45/10 |
| 2018/0334085 A1* | 11/2018 | Ichikawa | ............. | B60Q 1/1415 |
| 2019/0291641 A1* | 9/2019 | Takagaki | ............... | H05B 45/40 |
| 2020/0015328 A1* | 1/2020 | Wang | ...................... | H03K 7/08 |

FOREIGN PATENT DOCUMENTS

| | | | |
|---|---|---|---|
| JP | 2015159036 A | * | 9/2015 |
| JP | 2015159036 A | | 9/2015 |
| WO | 2010035168 A1 | | 4/2010 |

* cited by examiner

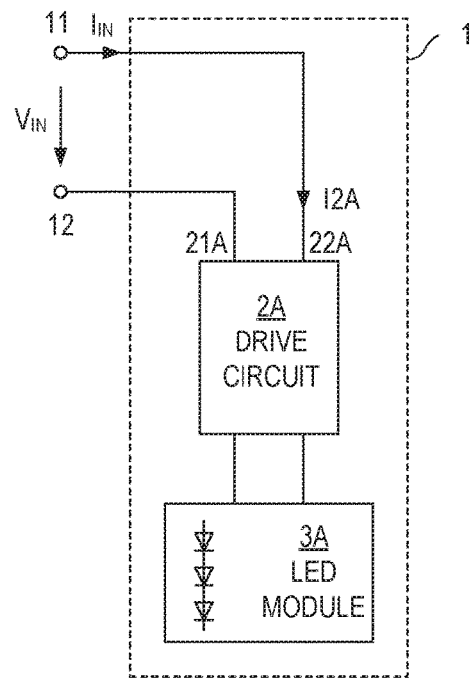
FIG 1
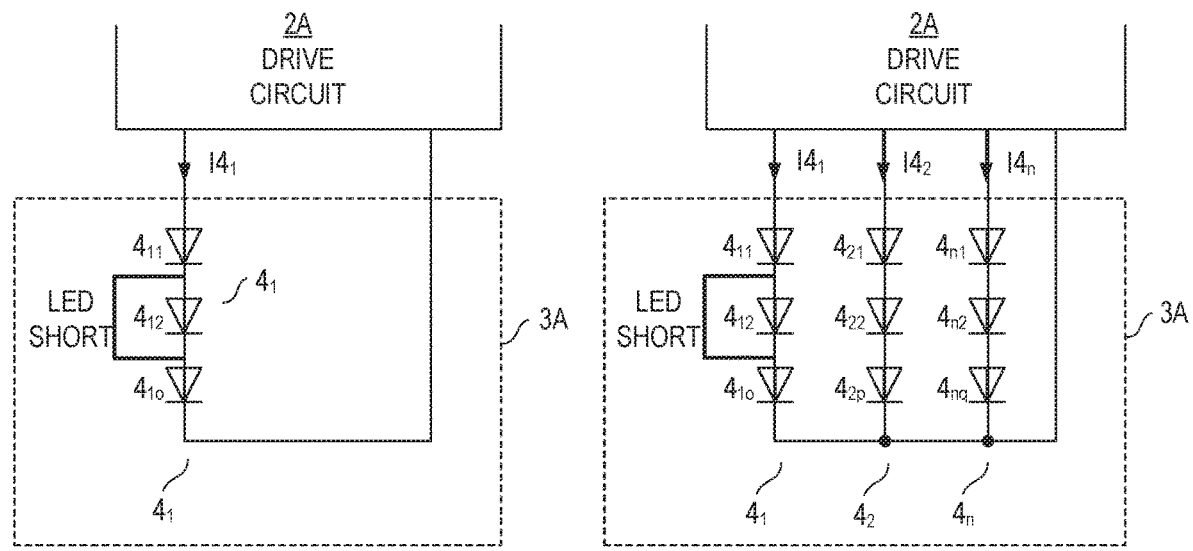
FIG 2
FIG 3

US 10,939,528 B2

ELECTRONIC CIRCUIT WITH AN LED MODULE

This Application claims priority to German Application Number 102018122649.7, filed on Sep. 17, 2018, the entire content of which is incorporated herein by reference.

This disclosure in general relates to an electronic circuit with at least one LED (Light Emitting Diode) string.

LED strings, which include a plurality of LEDs connected in series, are widely used for lighting purposes in various kinds of applications such as interior or exterior lighting in automobiles, or lighting in buildings, to name only a view. An LED string may be driven by a drive circuit that receives an input voltage and generates a drive current received by the LED string. The drive circuit may also be configured to monitor the LED string and detect a defect such as a short circuit of one of the LEDs in the LED string. The input voltage received by the drive circuit may be generated by a control circuit based on an input signal. When the input signal indicates that it is desired to switch on the LED string, the control circuit generates a voltage level of the input voltage high enough for the drive circuit to cause the LED string to light up. When the input signal indicates that it is desired to switch off the LED string, the control circuit generates a voltage level of the input voltage low enough to prevent the drive circuit from causing the LED string to light up.

In some applications it is desirable for the drive circuit to report the detection of an failure in the LED string to the control circuit. A dedicated communication channel connected between the control circuit and the drive circuit may be used by the drive circuit to report the failure to the control circuit. Such a dedicated communication channel, however, requires additional ports (pins) at each of the control circuit and the drive circuit and, therefore, increases the costs and the complexity of the overall system.

There is therefore a need for the drive circuit to indicate the detection of failure without requiring additional communication pins.

One example relates to an electronic circuit with an LED circuit. The LED circuit includes an input configured to receive an input voltage, a drive circuit connected to the input, and an LED module connected to the drive circuit and including an LED string with at least one LED. The drive circuit is configured to monitor the LED module for the occurrence of an LED short in the LED string and to change from a normal mode to a defect mode upon detection of the LED short. In the defect mode, the drive circuit is configured, to operate the LED string in at least one defect cycle that includes deactivating the LED string for a deactivation period, activating the LED string for an activation period, and checking for the persistence of the LED short in the activation period.

Another example relates to a method. The method includes monitoring an LED module for the occurrence of an LED short in an LED string and changing from a normal mode to a defect mode upon detection of the LED short by a drive circuit included in an LED circuit. The method further includes, in the defect mode of the drive circuit, operating the LED string in at least one defect cycle that includes deactivating the LED string for a deactivation period, activating the LED string for an activation period, and checking for the persistence of the LED short in the activation period.

Examples are explained below with reference to the drawings. The drawings serve to illustrate certain principles, so that only aspects necessary for understanding these principles are illustrated. The drawings are not to scale. In the drawings the same reference characters denote like features.

FIG. 1 shows one example of an electronic circuit that includes an LED circuit with a drive circuit and an LED module;

FIG. 2 shows one example of an LED module including one LED string;

FIG. 3 shows one example of an LED module including a plurality of LED strings;

Figure 4:
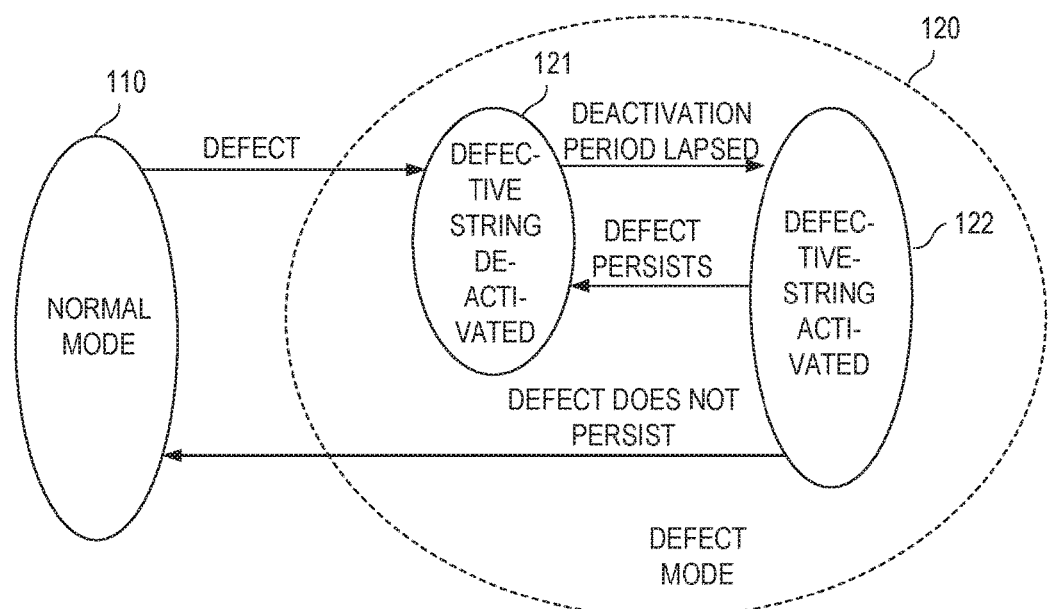
FIG. 4 shows a state diagram that illustrates one example of how the LED circuit may operate.

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

FIG. 1 schematically illustrates one example of an electronic circuit that includes an LED (Light Emitting Diode) circuit 1. The LED circuit 1 includes an input 11, 12, at least one drive circuit 2A connected to the input 11, 12, and an LED module 3A connected to the drive circuit 2A. The input 11, 12 is configured to receive an input voltage $V_{IN}$ and an input current $I_{IN}$. According to one example, the input includes a first input node 11 and a second input node 12. According to one example, the drive circuit 2A is connected to the input 11, 12 of the LED circuit 1 in that an input 21A, 22A of the drive circuit 2A is connected to the input 11, 12 of the LED circuit 1. The LED module 3A includes one or more LED strings with at least one LED. More specifically, the LED module 3A may include one LED string or may include a plurality of LED strings, wherein each LED string includes at least one LED.

FIG. 2 shows one example of the LED module 3A. In this example, the LED module 3A includes one LED string $4_1$. The LED string $4_1$ includes one or more LEDs. Referring to FIG. 2, the LED string $4_1$ may include a plurality of LEDs $4_{11}, 4_{12}, 4_{Io}$ connected in series. The LED string $4_1$ is connected to the drive circuit 2A and receives a string current $I4_1$ from the drive circuit 2A. Dependent on a current level of the string current $I4_1$, the LEDs of the string $4_1$ light up or do not light up. In the following, "on" and "off" are used interchangeably in place of "light up" and "do/does not light up", respectively.

FIG. 3 shows one example of an LED module 3A that includes plurality of LED strings $4_1$, $4_2$, $4_n$. Each of these LED strings is connected to the drive circuit 2A and receives a respective string current $I4_1$, $I4_2$, $I4_n$ from the drive circuit 2A, wherein the LEDs of each string $4_1$, $4_2$, $4_n$ light up dependent on a current level of the respective string current $I4_1$, $I4_2$, $I4_n$. According to one example, as illustrated in FIG. 3, each of these LED strings $4_1$, $4_2$, $4_n$ includes a plurality of LEDs. In this example, a first LED string $4_1$ includes a number of o LEDs $4_{11}$-$4_{1o}$, a second LED string $4_2$ includes a number of p LEDs $4_{21}$-$4_{2p}$, and an n-th LED string $4_n$ includes a number of q LEDs $4_{n1}$-$4_{nq}$. The number of LEDs in the individual LED strings $4_1$-$4_n$ can be the same, so that o=p=q. However, it is also possible that the LED strings $4_1$-$4_n$ include different numbers of LEDs, so that o≠p≠q.

In each of the examples illustrated in FIGS. 2 and 3, the overall number of LEDs in one LED string can range from 1 to several 10, such as from 1 to 50, in particular, from 1 to 30. Further, the number n of LED strings in one LED module 3A may range from one to several 10 such as from one to 50. Just for the purpose of illustration, the LED module 3A shown in FIG. 3 includes n=3 LED strings $4_1$-$4_n$.

According to one example, the LEDs connected in series in one LED string $4_1$-$4_n$ are of the same type so that, at given string current $I4_1$-$I4_n$, they light with essentially the same intensity. LEDs of different strings can be of the same type or of different types. That is, the different strings $4_1$-$4_n$ in the LED module 3A can light up at the same string current or at a different string current. That a string is lit up means that the LEDs of the string are lit up.

According to one example, the drive circuit 2A is configured to generate the at least one string current $I4_1$-$I4_n$ such that the LEDs of the at least one LED string $4_1$-$4_n$ light up whenever the input voltage $V_{IN}$ received by the drive circuit 2A is high enough for the drive circuit 2A to generate the at least one string current $I4_1$-$I4_n$ such that it causes the at least one string $4_1$ to light up. During operation of the LED module 3A, a defect may occur. One type of defect that may occur is a short circuit of one single LED, which is briefly referred to as LED short in the following. In the case of an LED short, the defect (shorted) LED is off, while the remainder of the LEDs in the LED string are still on. An example of an LED short in one $4_{12}$ of the LEDs of string $4_1$ is illustrated in bold lines in FIGS. 2 and 3.

According to one example, the drive circuit 2A is configured to monitor the LED module 3A for the occurrence of an LED short in the at least one LED string $4_1$-$4_n$ and to change from a normal mode to a defect mode upon detection of such LED short. This is explained with reference to FIGS. 2, 3 and 4 in the following.

FIG. 4 illustrates a state diagram of the drive circuit 2A. Referring to FIG. 4, the drive circuit 2A either operates in a normal mode 110 or a defect mode 120. In the normal mode 110, the drive circuit 2A, based on the input voltage $V_{IN}$ received at the input 11, 12, generates the string current $I4_1$-$I4_n$ received by the at least one LED string $4_1$-$4_n$ such that the LEDs of the at least one LED string $4_1$-$4_n$ light up. Upon detecting an LED short in one of the one or more LED strings $4_1$-$4_n$ connected to the drive circuit 2A, the drive circuit 2A changes from the normal mode 110 to the defect mode 120. The string in which the LED short (defect) has been detected is referred to as "defective string" in the following.

Referring to FIG. 4, in the defect mode, the drive circuit 2A operates the defective LED string in at least one defect cycle by deactivating the defective LED string for a deactivation period, activating the LED string for an activation period after the deactivation period, and checking for the persistence of the LED short in the activation period. When checking for the persistence of the LED short reveals that the defect persists, the defective LED string is again deactivated for the deactivation period. When, however, checking for the persistence of the LED short during the activation period reveals that the LED short does not persist, operation of the drive circuit 2A changes from the defect mode 120 back to the normal mode 110.

Figure 5:
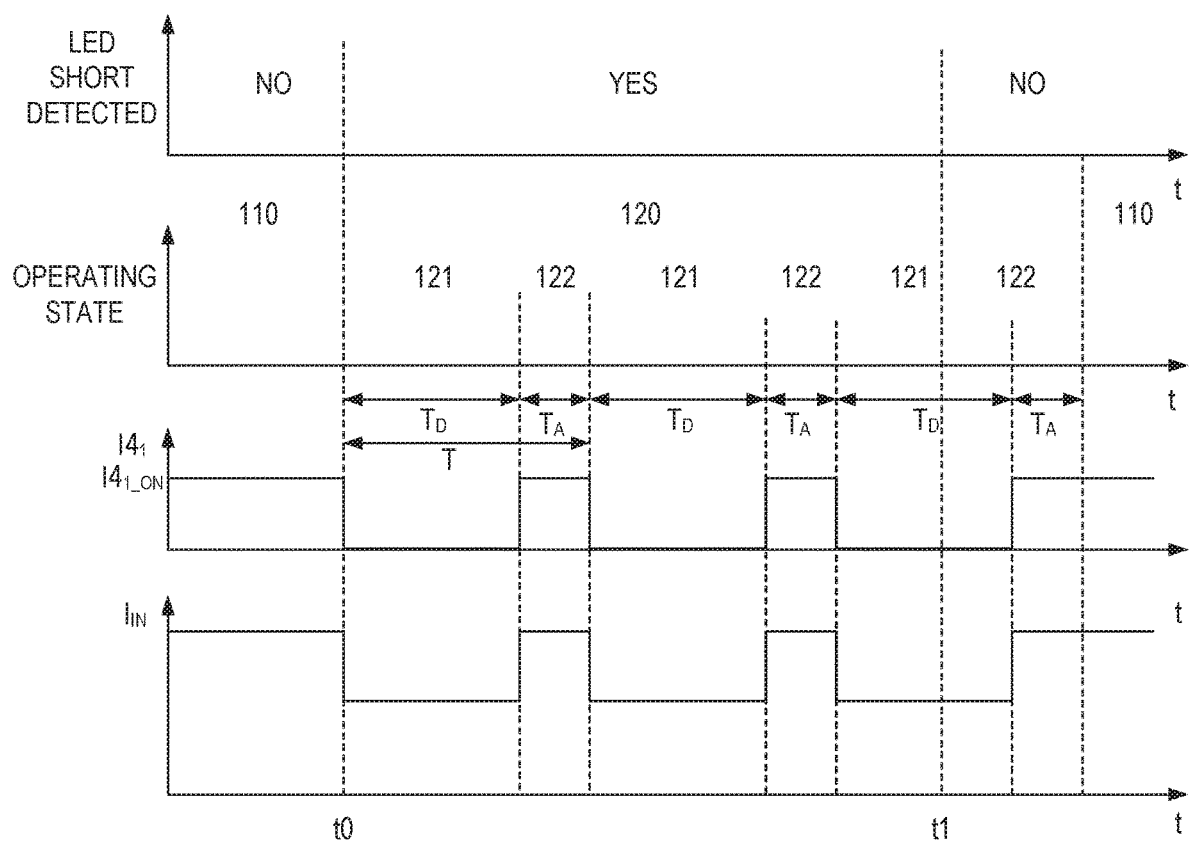
FIG. 5 shows timing diagrams that illustrates one example of how the LED circuit may operate.

FIG. 5 shows timing diagrams that illustrate how the drive circuit 2A operates in the defect mode. In particular, FIG. 5 shows timing diagrams that illustrate the operating state of the drive circuit 2A, the input current $I_{IN}$ received by the drive circuit 2A, and the string current $I4_1$ of the defective string $4_1$ (just for the purpose of illustration it is assumed that string $4_1$ is defective). In the example illustrated in FIG. 5, an LED short in the defective LED string $4_1$ is detected at a first time instance t0 so that the drive circuit 2A changes from the normal mode 110 to the defect mode 120 at the first time instance t0. In the normal mode, the string current $I4_1$ has a current level $I4_{1\_ON}$ that is high enough for the LEDs of the string $4_1$ to light up. Referring to the above, operating the defective string in the defect mode 120 includes at least one defect cycle, wherein several of such defect cycles are illustrated in FIG. 5. In each of these defect cycles, the defective string $4_1$ is deactivated for a deactivation period $T_D$ and activated for an activation period $T_A$.

"Deactivated" means that the string current $I4_1$ of the defective string is significantly lower than the level $I4_{1\_ON}$ in the normal mode 110, such as less than 20% or less than 10% of the current level in the normal mode 110, so that the LEDs of the defective string $4_1$ are off. According to example, the current level of the string current $I4_1$ during the deactivation period $T_D$ is zero. During the activation period $T_A$ the current level of the string current $I4_1$ is such that the non-defect LEDs of the defective LED strings are on. According to one example, the current level of the string current $I4_1$ during the activation period $T_A$ essentially equals the current level $I4_{1\_ON}$ in the normal mode 110. According to another example, the current level during the activation period $T_A$ is even higher than the current level $I4_{1\_ON}$ in the normal mode 110, such as between 100% and 120% of the current level $I4_{1\_ON}$ in the normal mode.

In the example illustrated in FIG. 5, the defect disappears at a second time instance t1, so that, in the activation period following this time instance t1, the defect can no longer be detected and the drive circuit 2A returns to the normal mode 110. An LED short may be due to bad soldering process to, conductive dust, etc. In these cases, an LED short may occur and again disappear after a certain time.

According to one example, the activation period $T_A$ is long enough to enable the drive circuit 2A to detect whether there still an LED short in the defective string. According to one example, the duration of the activation period $T_A$ is selected from between 50 microseconds (µs) and 100 microseconds, in particular between 70 microseconds and 80 microseconds. According to one example, the duration of the deactivation period $T_D$ is significantly longer than the duration of the deactivation period $T_A$. According to one example, the duration of the deactivation period $T_D$ is at least 50 times or at least 100 times the duration of the activation period $T_A$. This has the effect that the "average" string current $I4_1$ in defect mode 120 is significantly lower than the current level $I4_{1\_ON}$ of the string current $I4_1$ in the normal mode 110. The defect mode 120 can therefore also be referred to as low current consumption mode. During the defect mode 120, not only the (average) current consumption of the defective LED string $4_1$ is reduced, but also the input current $I_{IN}$ of the LED circuit 1 is reduced. Upon entering the defect mode (lower current consumption mode), the LED circuit 1, by only using the input nodes 11, 12, can communicate that an LED short has been detected in an LED string connected to the drive circuit 2A. How strongly the (average) input current $I_{IN}$ decreases when the drive circuit 2A changes from the normal mode 110 to the defect mode 120 is dependent on a ratio between the durations of the activation periods $T_A$ and the deactivation periods $T_D$, but may also be dependent on the overall number of LED strings connected to the drive circuit 2A and the way non-defective LED strings are operated in the defect mode 120. Examples of how these non-defect LED strings may be operated are explained herein further below.

According to one example, durations of the activation periods $T_A$ and the deactivation periods $T_D$ are adapted to one another such that a defect cycle period T, which is given by the duration of one activation period $T_A$ and the duration of one deactivation period $T_D$, is between five milliseconds (ms) and twenty milliseconds. In this case, a defect cycle frequency, which is the reciprocal 1/T of the defect cycle period is between 200 Hz and 50 Hz. At this defect cycle frequency, the non-defective LEDs (which are the LEDs that do not include an LED short) of the defective string $4_1$ switch on and off. At a defect cycle frequency of between 50 Hz and 200 Hz, a visible flickering of the non-defective LEDs of the defective LED string can be widely avoided.

Figure 6:
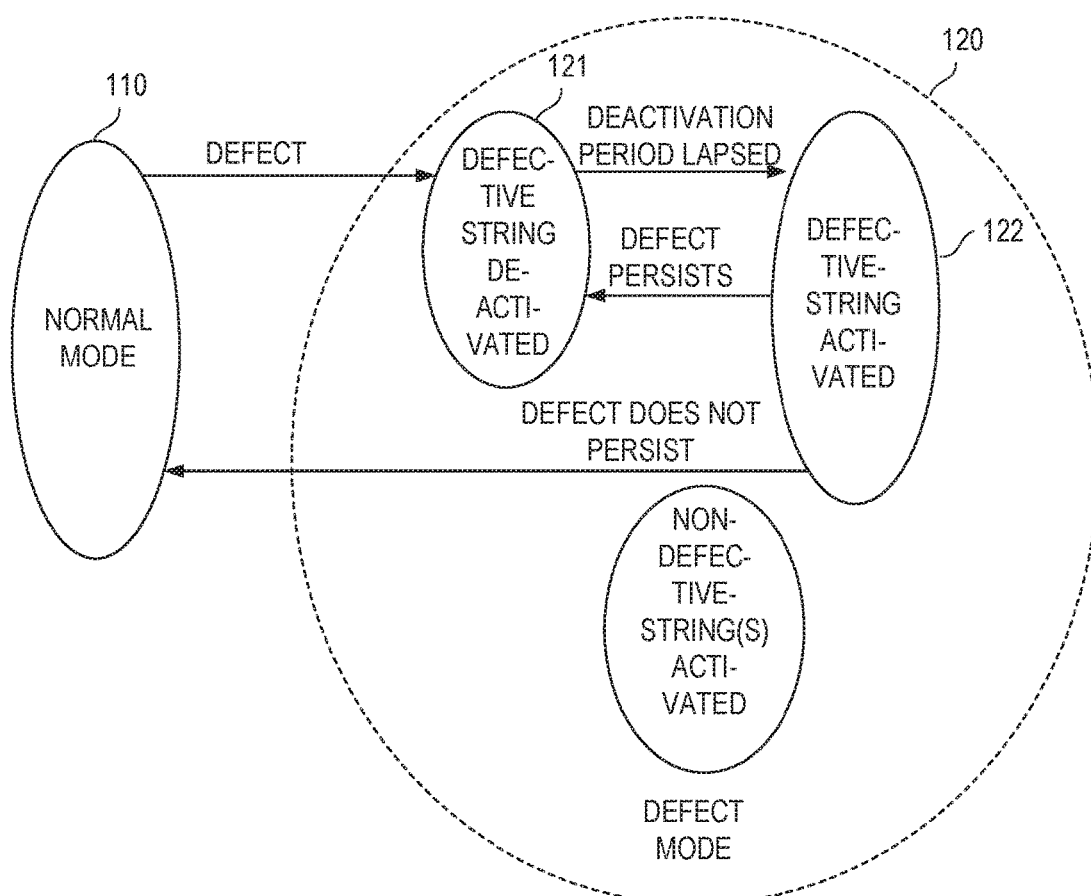
FIGS. 6 to 8 show modifications of the state diagram shown in FIG. 4.
Figure 7:
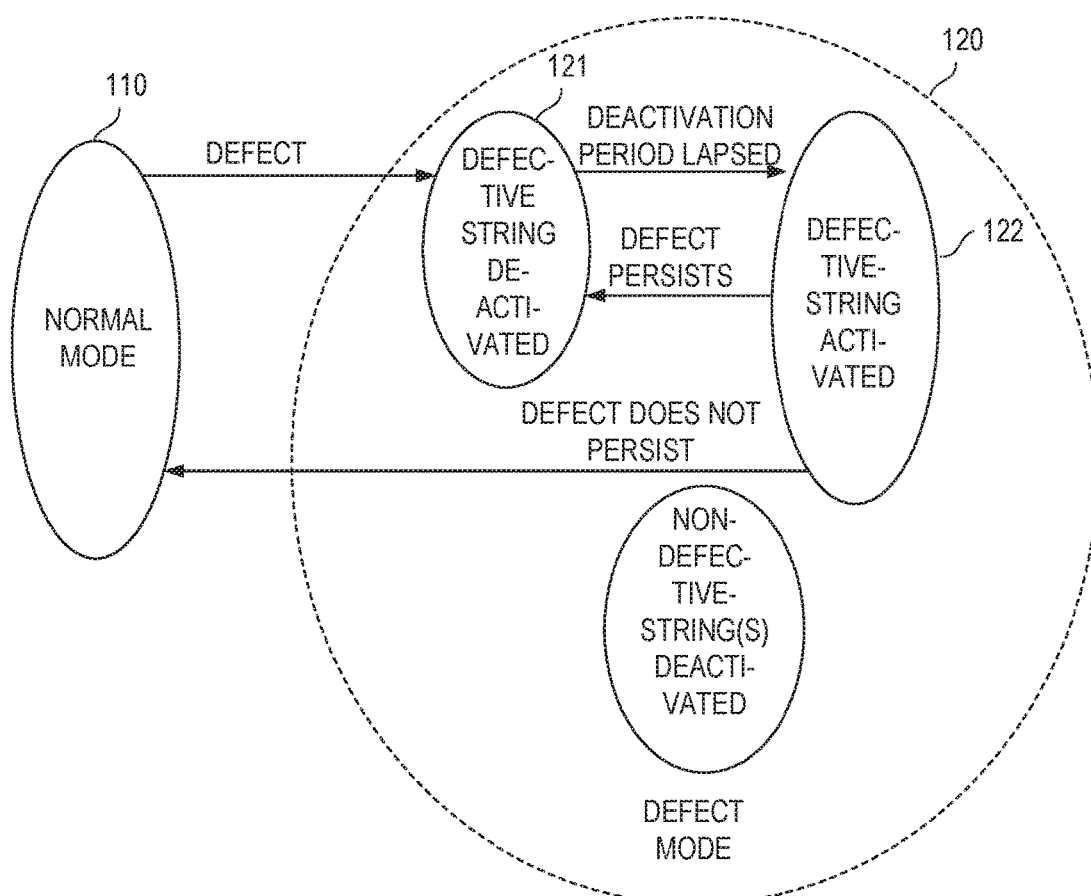
Figure 8:
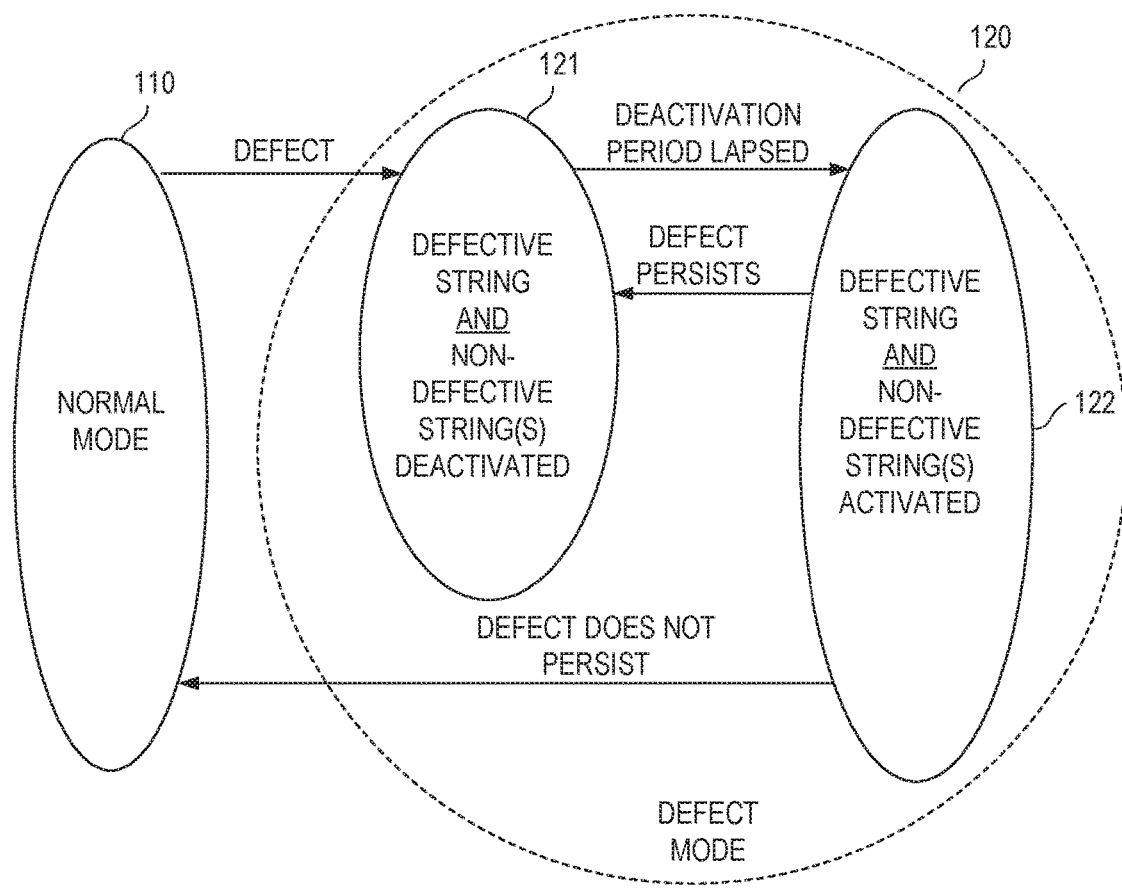

Referring to the above, a plurality of LED strings $4_1$-$4_n$ can be connected to the drive circuit 2A, wherein the drive circuit 2A is configured to monitor each of these LED strings $4_1$-$4_n$ for the occurrence of an LED short and enters the defect mode 120 when an LED short in one of the plurality of LED strings $4_1$-$4_n$ is detected. Thus, the drive circuit 2A enters the defect mode 120 when one of the LED strings, such as LED string $4_1$ explained with reference to FIG. 5, is defective, while the remainder $4_2$-$4_n$ of the LED strings $4_1$-$4_n$ are not defective. In the defect mode 120 there are several ways to operate the non-defective LED strings $4_2$-$4_n$. Some examples of how the non-defective LED strings $4_2$-$4_n$ may be operated are explained with reference to FIGS. 6 to 8 in the following. Each of these FIGS. 6 to 8 shows a state diagram of the drive circuit 2A. Each of these state diagrams is based on the state diagram illustrated in FIG. 4.

Referring to FIG. 6, the non-defective strings $4_2$-$4_n$ are activated in the defect mode 120 so that the non-defective strings $4_2$-$4_n$ light up in the same way as in the normal mode 110. In this case, the reduction of the input current $I_{IN}$ in the defect mode as compared to the normal mode 110 is only caused by the reduction of the (average) string current $I4_1$ of the defective string $4_1$.

According to another example illustrated in FIG. 7, the non-defective strings are deactivated in the defect mode 120. In this case, the input current $I_{IN}$ increases to zero during the deactivation periods $T_D$. Further, during the activation periods $T_A$, the input current $I_{IN}$ is only given by current $I4_1$ flowing into the defective string during the activation periods $T_A$. In this case, the input current $I_{IN}$ is significantly reduced when the drive circuit changes from the normal mode 110 to the defect mode 120.

According to another example (not shown) some of the non-defective strings are activated and others of the non-defective strings are deactivated during the defect mode 120. By suitably selecting a ratio between the number of activated and the number of deactivated non-defective strings, the reduction of the input current $I_{IN}$ when the drive circuit changes from the normal mode 110 to the defect mode 120 can be adjusted. Referring to the above, a detectable reduction of the input current $I_{IN}$ when the drive circuit 2A changes from the normal mode 110 to the defect mode 120. may be desired as this reduction is used to communicate the detection of an LED short from the drive circuit 2A to an external circuit connected to the input nodes 11, 12 via the input nodes 11, 12. An example of such an external circuit is explained in detail herein further below.

According to another example illustrated in FIG. 8, in the defect mode 120, the defective string $4_1$ and the non-defective strings $4_2$-$4_n$ are operated in defect cycles of the type explained with reference to FIG. 5 as long as the defect in the defective string $4_1$ persists. This also causes a significant reduction of the input current $I_{IN}$ because the input current $I_{IN}$ is zero during the deactivation periods $T_D$ and is different from zero only during the activation periods $T_A$. As, referring to the above, the durations of the activation periods $T_A$ can be significantly shorter than the durations of the deactivation periods $T_D$ the (average) input current $I_{IN}$ is significantly reduced during the defect mode 120.

According to one example, the drive circuit 2A cyclically activates and deactivates the defective string $4_1$ as long as the defect persists. According to another example, the drive circuit 2A counts the number of defect cycles and deactivates the defect string $4_1$ when a predefined number of defect cycles has been reached. The drive circuit 2A may again activate the defective cycle only after a shutdown, that is, after the input voltage $V_{IN}$ has fallen below a threshold that causes the LED circuit 1 to switch off the LED module and after the input voltage $V_{IN}$ has increased to above this threshold.

Figure 9:
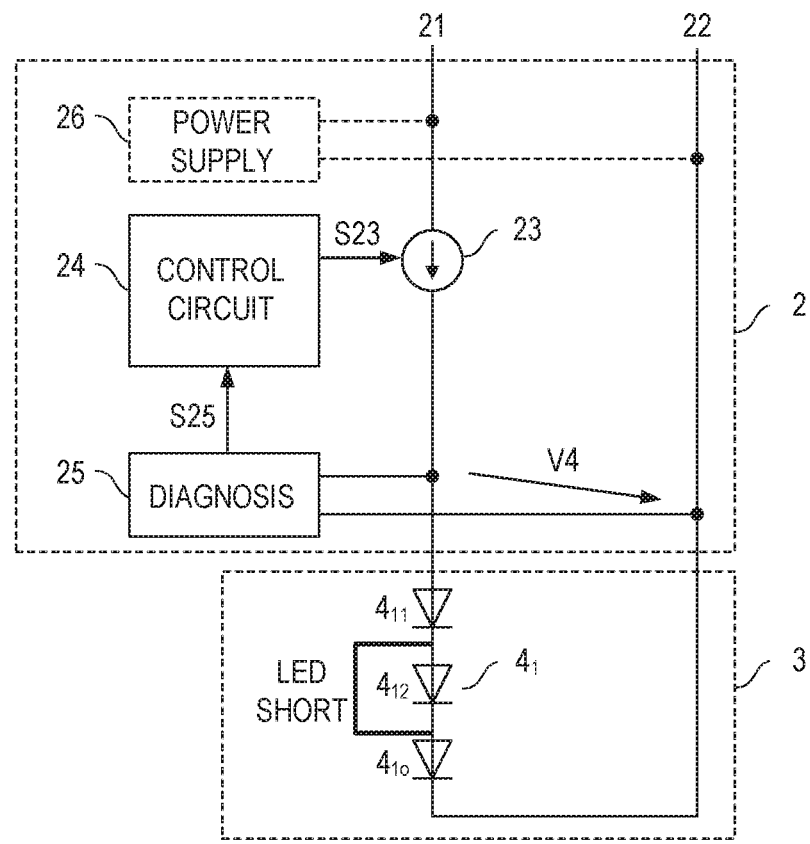
FIG. 9 shows one example of the drive circuit in greater detail.

FIG. 9 shows one example of the drive circuit 2A that is configured to monitor the LED module 3A and operates in the defect mode 120 upon detecting an LED short in an LED string. Just for the purpose of explanation, there is only one LED string $4_1$ connected to the drive circuit 2A in the example shown in FIG. 9. An example of the drive circuit 2A having more than one LED strings connected thereto is explained herein further below. Referring to FIG. 9, the drive circuit 2A includes a current source 23 connected in series to the LED string $4_1$, wherein a series circuit including the LED string $4_1$ and the current source 23 is connected between the input nodes 21A, 22A of the drive circuit 2A. The current source 23 is a controllable current source that is controlled by a control signal S23 received from a control circuit 24. The current source 23 provides the string current $I4_1$, wherein the current level of the string current $I4_1$ is dependent on the control signal S23. According to one example, the control signal S23 can have two signal levels, a first signal level that activates the current source 23 so that the string current $I4_1$ provided by the current source 23 has a first current level ($I4_{1\_ON}$ in FIG. 5) that causes the (non-defective) LEDs of the LED string $4_1$ to light up, and a second signal level, that switches off the current source 23 so that the current level of the string current $I4_1$ is zero. This, however, is only an example. The control signal S23 may have more than two signal levels may that cause the current source 23 to generate more than two different current levels of the string current $I4_1$.

Referring to FIG. 9, the drive circuit 2A further includes a diagnostic circuit 25. The diagnostic circuit 25 is connected to the LED string $4_1$ and is configured to detect a voltage $V4_1$ across the LED string $4_1$ and generate the diagnostic signal 25 based on monitoring the string voltage $V4_1$. The control circuit 24 receives the diagnostic signal S25 and drives the current source 25 dependent on the diagnostic signal S25. According to one example, the diagnostic signal S25 can have two different signal levels, a first signal level, which is also referred to as normal level in the following, that indicates that a defect has not been detected by a diagnostic circuit 25, and a second signal level, which is also referred to as defect level in the following, that indicates that an LED short has been detected by the diagnostic circuit 25.

Figure 10:
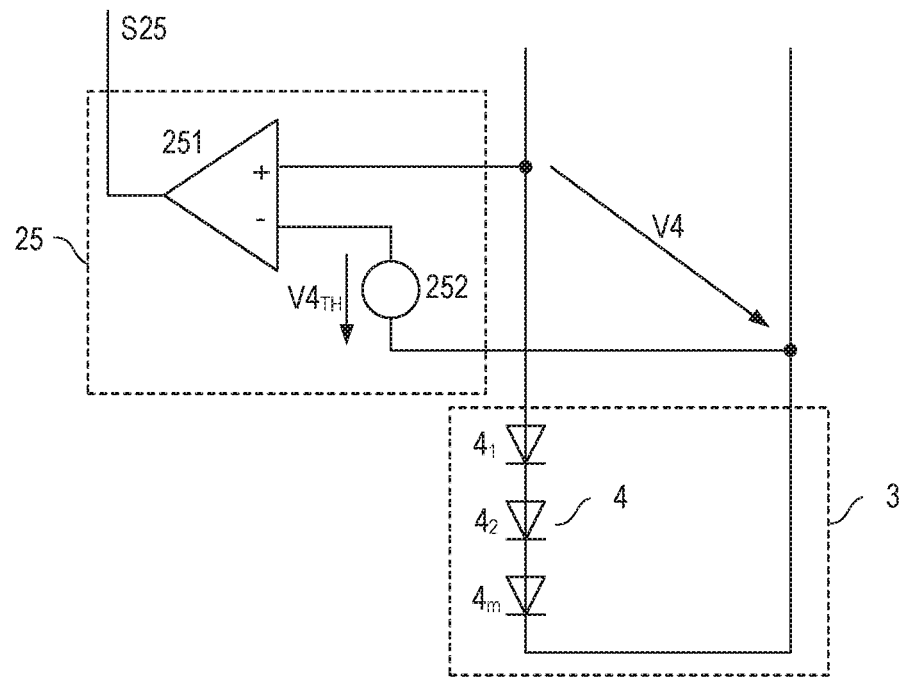
FIG. 10 shows one example of a diagnostic circuit implemented in the drive circuit shown in FIG. 9.

One example of the diagnostic circuit 25 is illustrated in FIG. 10. In this example, the diagnostic circuit 25 compares the string voltage $V4_1$ with a threshold voltage $V4_{TH}$ and generates the diagnostic signal S25 based on comparing the string voltage $V4_1$ with the threshold voltage $V4_{TH}$. According to one example, a normal level of the diagnostic signal S25 is generated when the string voltage $V4_1$ is higher than the threshold voltage $V4_{TH}$, and a defect level is generated when string voltage $V4_1$ is below the threshold voltage $V4_{TH}$. In other words, a string voltage $V4_1$ below the threshold voltage $V4_{TH}$ indicates that there is an LED short in at least one of the LEDs $4_{11}$-$4_{1o}$ of the LED string $4_1$. The threshold voltage $V4_{TH}$ is selected such that the string voltage $V4_1$ is higher than the threshold voltage $V4_{TH}$ when each of the LEDs $4_{11}$-$4_{1o}$ is non-defect and when the current source 23, in the normal mode of the drive circuit 2A, generates the string current $I4_1$ with the first current level, which is high enough to cause the LEDs to light up. The string current $I4_1$ causes a voltage drop across each non-defective LED, wherein a voltage value of the respective voltage drop is dependent on the current level of the string current $I4_1$ and the specific type of the LEDs. The voltage drop across one LED is associated with the string current that causes the voltage drop by the characteristic curve of the respective LED. When the string $4_1$ is not defective, the string voltage $V4_1$ is given by the sum of the voltage drops caused by the string current $I4_1$ across the individual LEDs $4_{11}$-$4_{1o}$. When a LED short in one of the LEDs occurs, the string current $4_1$ is reduced by the voltage across the defective LED before the LED short occurred. The threshold voltage $V4_{TH}$ is adapted to the string voltage $V4_1$ that occurs when the LED string is not defect in such a way that the string voltage $V4_1$ is higher than the threshold voltage $V4_{TH}$ when the string is not defect and falls below the threshold voltage $V4_{TH}$ when an LED short in one of the LEDs occurs.

Referring to FIG. 10, the threshold voltage $V4_{TH}$ may be provided by a threshold voltage source 252 and the diagnostic signal S25 may be provided by a comparator 251 that receives the string voltage $V4_1$ at one input and the threshold voltage $V4_{TH}$ at another input. In the example in FIG. 10, the comparator receives the string voltage $V4_1$ at a non-inverting input. In this example, the defect level is a low signal level and the normal level is a high signal level of the diagnostic signal. This, however, is only an example.

Referring to FIG. 9, the drive circuit 2A may further include a power supply 26. The power supply 26 is connected to the input nodes 21A, 22A, receives the input voltage $V_{IN}$ and generates supply voltages (not shown in FIG. 9) received by the control circuit 24 and the diagnostic circuit 25. According to one example, the control circuit 24 is configured to activate the current source 23 in order to light up the LEDs immediately after start up, that is immediately after the power supply 26 supplies the control circuit 24 and the diagnostic circuit 25.

According to one example, the diagnostic circuit 25 is implemented such that the defect level of the diagnostic signal S25 persists when the LED string $4_1$ is deactivated by switching off the string current $I4_1$. The signal level of the diagnostic signal S25 only changes from the defect level to the normal level when, during the activation period $T_A$, the string voltage $V4_1$ rises to above the threshold voltage $V4_{TH}$ and the drive circuit returns to the normal mode 110.

The control circuit 24 is configured to operate the drive circuit 2A in the defect mode 120 when the diagnostic circuit S25 indicates that an LED short has been detected. Referring to the above, operating the drive circuit 2A in the defect mode includes cyclically activating and deactivating the LED string $4_1$.

Figure 11:
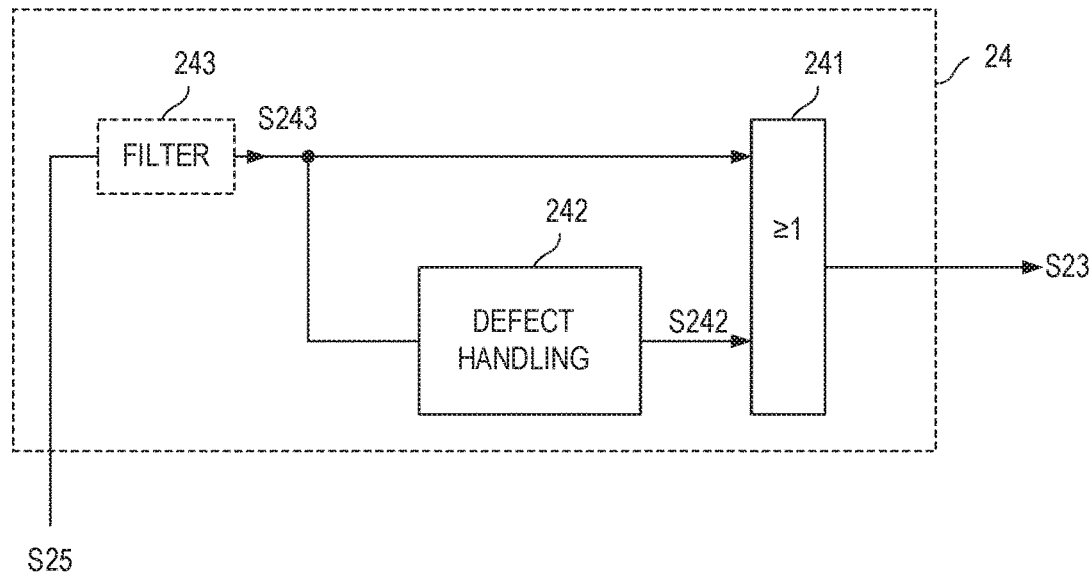
FIG. 11 shows one example of an error handling circuit implemented in the drive circuit shown in FIG. 9.

One example of the control circuit 24 is illustrated in FIG. 11. The control circuit shown in FIG. 24 is configured to generate the control signal S23 received by the current source (23 in FIG. 9) such that the current source 23 is activated when the diagnostic signal S25 has the normal level, and such that the current source is cyclically deactivated and activated when the diagnostic signal S25 has the defect level. Referring to FIG. 11, the control circuit 24 may include a logic gate 24 that receives the diagnostic signal S25 and an output signal S242 from a defect handling circuit 242 and is configured to generate the control signal S23 based on the diagnostic signal S25 when the diagnostic signal has the normal level and based on the output signal S242 from the defect handling circuit 242 when the diagnostic signal S25 has the defect level. According to one example, the logic gate 241 is an OR gate, the normal level of the diagnostic signal S25 is a high level and the signal level of the control signal S23 that activates the current source 23 is a high level. The defect handling circuit 242 receives the diagnostic signal S25 and is configured to generate its output signal S242 such that the current source 23 is cyclically deactivated for the deactivation period $T_D$ and activated for the activation period $T_A$ explained above.

Figure 12:
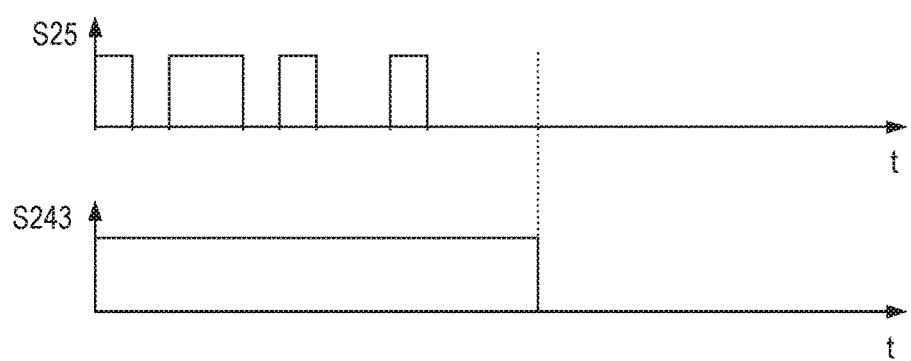
FIG. 12 shows signal waveforms that illustrate the function of an input filter implemented in the error handling circuit shown in FIG. 11.

According to one example, the control circuit (as shown in FIG. 11) includes a filter 243 that filters the diagnostic signal S25 to provide a filter output signal S243, wherein the filter output signal S243 is received by the logic gate 241 and the defect handling circuit 242. In this example, the current source is activated when the filter output signal has a normal level and is cyclically deactivated and activated when the filter output signal S243 has a defect level. According to one example, the filter 243 has a low-pass characteristic so that the filter output signal S243 changes from the normal level (which is a high level in the example shown in FIG. 12) to the defect level (which is a low level in the example shown in FIG. 12) only when the defect level of the diagnostic signal S25 persists longer than a predefined time period. This ensures that short (erroneous) changes of the diagnostic signal S25 from the normal level to the defect level do not cause the control circuit 24 to enter the defect mode.

Figure 13:
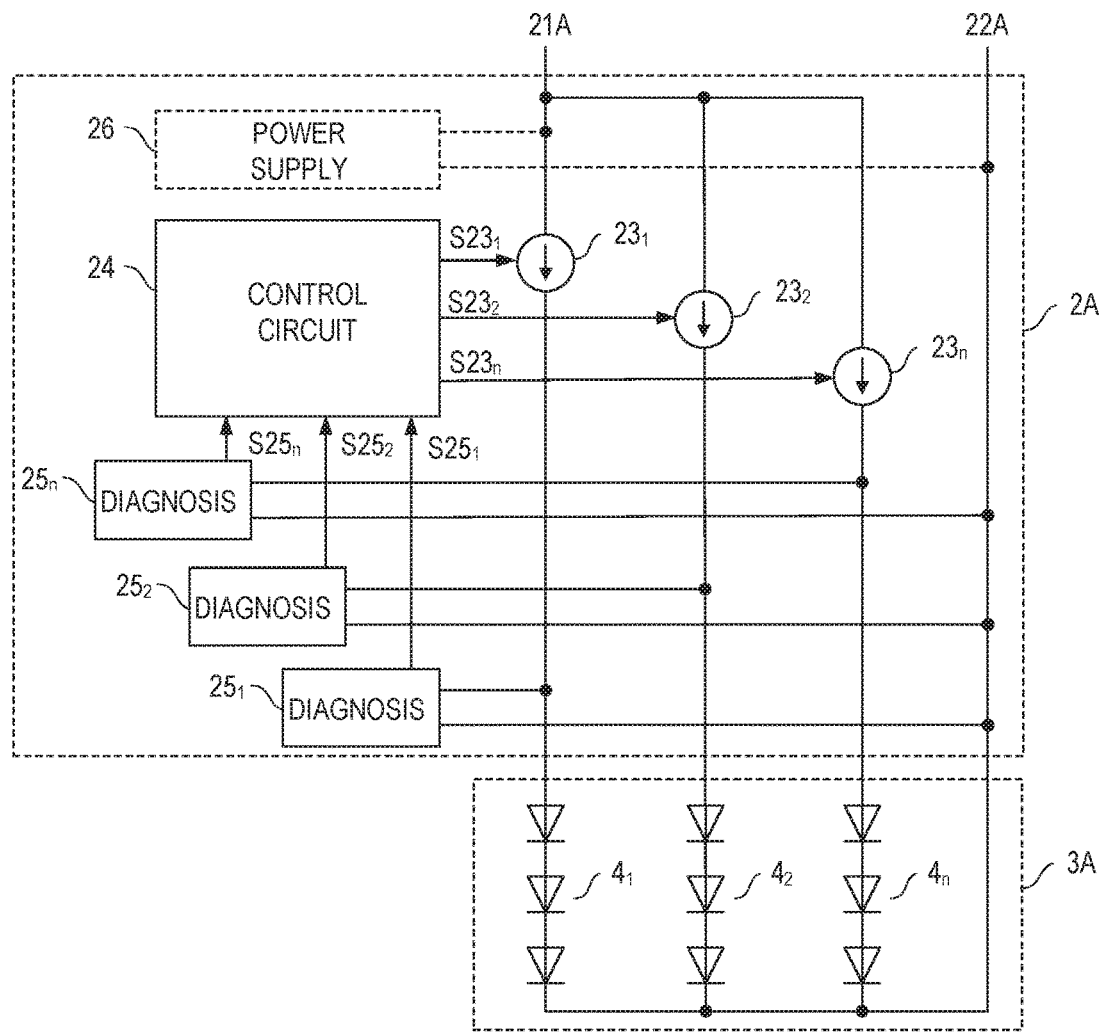
FIG. 13 shows a further example of the drive circuit.

FIG. 13 shows one example of a drive circuit 2A configured to have an LED module 3A with several LED strings $4_1$-$4_n$ connected thereto. In this example, the drive circuit 2A includes a plurality of current sources $23_1$, $23_2$, $23_n$, wherein each of these current sources is connected to a respective one of the plurality of LED strings $4_1$, $4_2$, $4_n$. Further, the drive circuit 2A includes a plurality of diagnostic circuits $25_1$-$25_n$, wherein each of these diagnostic circuits is configured to monitor one of these LED strings $4_1$-$4_n$ for the occurrence of an LED short. The control circuit 24 receives a diagnostic circuit $S25_1$, $S25_2$, $S25_n$ from each of these diagnostic circuits $25_1$-$25_n$ and drives the current sources $25_1$-$25_n$ dependent on these diagnostic circuits $S25_1$-$S25_n$ in accordance with one of the examples explained with reference to FIGS. 6 to 8. If, for example, an LED short is detected string $4_1$ by diagnostic circuits $25_1$, the control circuit 24 enters the defect mode and cyclically activates and deactivates the defective LED string $4_1$ by cyclically activating and deactivating the respective current source $23_1$. The current sources $23_2$-$23_n$ connected to the non-defective LED strings $4_2$-$4_n$ can be activated by the control circuit 24 (so that the non-defective LED strings are activated) or can be deactivated (so that the non-defective LED strings are deactivated).

Figure 14:
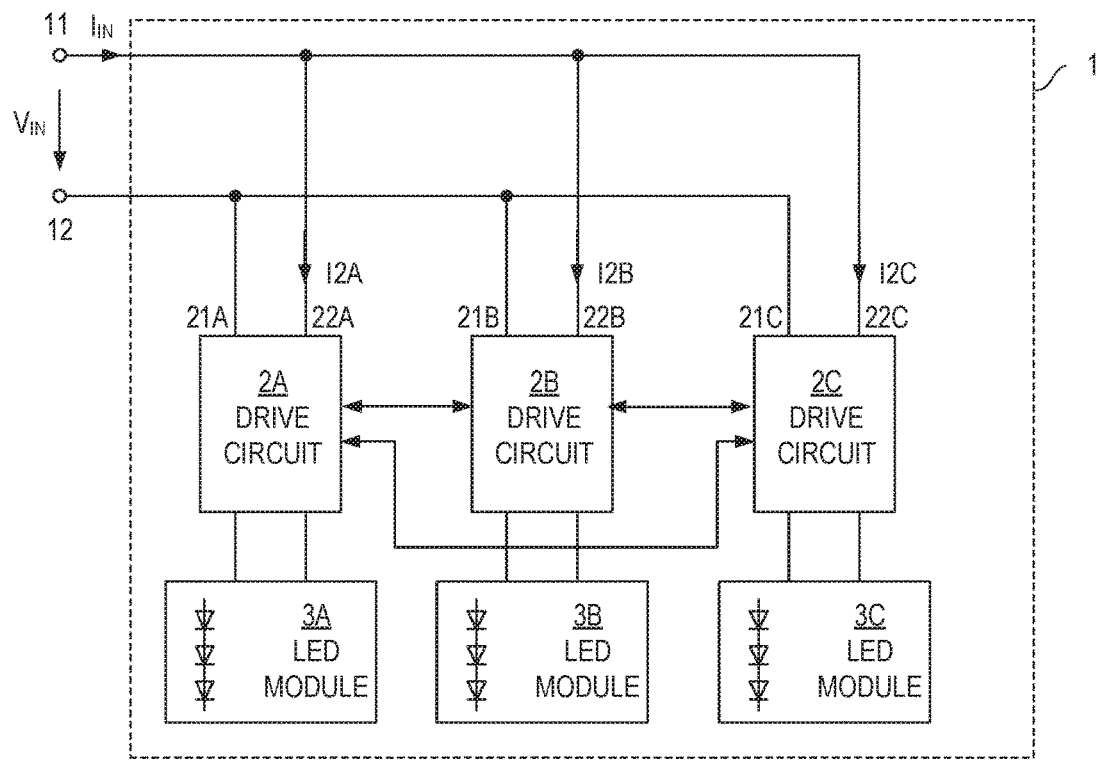
FIG. 14 shows one example of an LED circuit that includes several drive circuits and several LED modules.

FIG. 14 shows a modification of the LED circuit 1 shown in FIG. 1. The LED circuit 1 shown in FIG. 14 includes a plurality of drive circuits 2A-2C, wherein each of these drive circuits 2A-2C has a respective LED module 3A-3C connected thereto. Each of the drive circuits 2B, 2C can be implemented in the same way as drive circuit 2A explained herein before. Further each of the LED modules 3B, 3C can be implemented in accordance with the LED module 3A explained herein before. Referring to FIG. 14, each of the drive circuits 2A-2C is connected to the input 11, 12, so each of these drive circuits 2A-2C receives the input voltage $V_{IN}$.

According to one example, the drive circuits 2A-2C are in signal communication with each other so that each of these drive circuits 2A-2C is configured to communicate the detection of an LED short in the respective LED module connected thereto to the other drive circuits. Communication paths between the drive circuits 2A-2C are only schematically illustrated in FIG. 14. These communication paths can be implemented as unidirectional signal lines, between each one of the drive circuits 2A-2C and each other one of the drive circuits 2A-2C, as bidirectional signal lines (as illustrated) between each pair of drive circuits 2A-2C, or as a signal bus to which each of the drive circuits is connected to.

Just for the purpose of explanation it is assumed that a first LED module 3A connected to a first drive circuit 2A is defect, that is, there is an LED short in an LED in one of the one or more LED strings (see $4_1$ in FIG. 2 or $4_1$-$4_n$ shown in FIG. 3) implemented in the first LED module 3A. In this case, the first drive circuit 2A may change from the normal mode to the defect mode and operate the LED module 3A in one of the ways explained with reference to FIGS. 6 to 8. Upon receiving the defect information from the first drive circuit 2A, the drive circuits 2B, 2C connected to non-defective LED modules 3B, 3C may switch off these LED modules in order to reduce the overall input current $I_{IN}$ as long as the first drive circuit 2A is in the defect mode. "Switching off an LED module" includes decreasing the string current of the at least LED string included in the LED module to zero.

Figure 15:
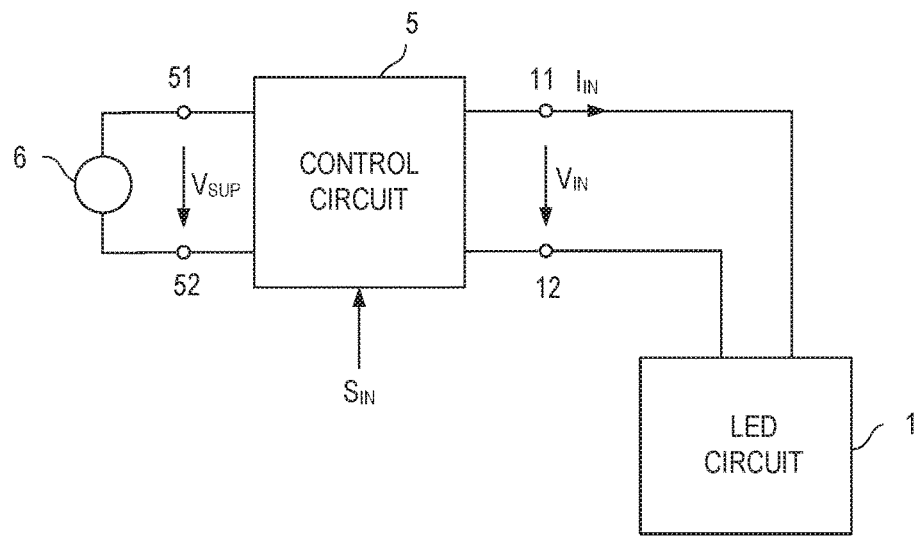
FIG. 15 shows one example of an electronic circuit that includes an LED circuit and a control circuit.

Referring to FIG. 15, the input voltage $V_{IN}$ may be provided to the LED circuit 1 by a control circuit 5 connected to the input 11, 12 of the LED circuit 1. The LED circuit 1 may include one drive circuit, as explained with reference to FIG. 1, or several drive circuits, as explained with reference to FIG. 14, wherein each of these drive circuits is connected to an LED module that includes one or more LED strings. The control circuit 5 includes an input 51, 52 configured to receive a supply voltage $V_{SUP}$ from a supply voltage source 6 and a control input 53 configured to receive a control signal $S_{IN}$. According to one example, the control circuit 5 is configured to generate the input voltage $V_{IN}$ received by the LED circuit 1 dependent on the input signal $S_{IN}$. According to one example, the control circuit 5 generates the input voltage $V_{IN}$ such that the input voltage $V_{IN}$ has a first voltage level that causes the at least one drive circuit (not shown in FIG. 15) in the normal mode to switch on the LEDs of the at least one LED string (also not shown in FIG. 15) connected to the drive circuit 2A. Further, the control circuit 5 may generate a second signal level of the input voltage $V_{IN}$, wherein this voltage level is such that it is not high enough for the at least one drive circuit 2A to switch on the LEDs. The control circuit 5 generates the first and second voltage level of the input voltage $V_{IN}$ based on the input signal $S_{IN}$, so that in the normal mode, the at least one LED module included in the LED circuit 1 switches on or switches off dependent on the input signal $S_{IN}$.

Figure 16:
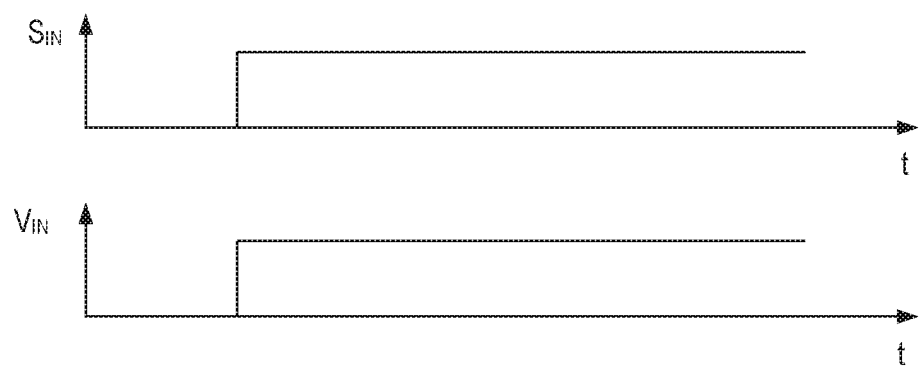
FIG. 16 shows signal waveforms that illustrate the function of the control circuit shown in FIG. 15.

This is illustrated in FIG. 16 that shows one example of signal waveforms of the input signal $S_{IN}$ and the input voltage $V_{IN}$. In the example shown in FIG. 16, the signal level of the input signal $S_{IN}$ that causes an on-level of the input voltage is a high signal level and a signal level that causes an off-level of the input voltage $V_{IN}$ is a low signal level. This, however, is only an example.

Figure 17:
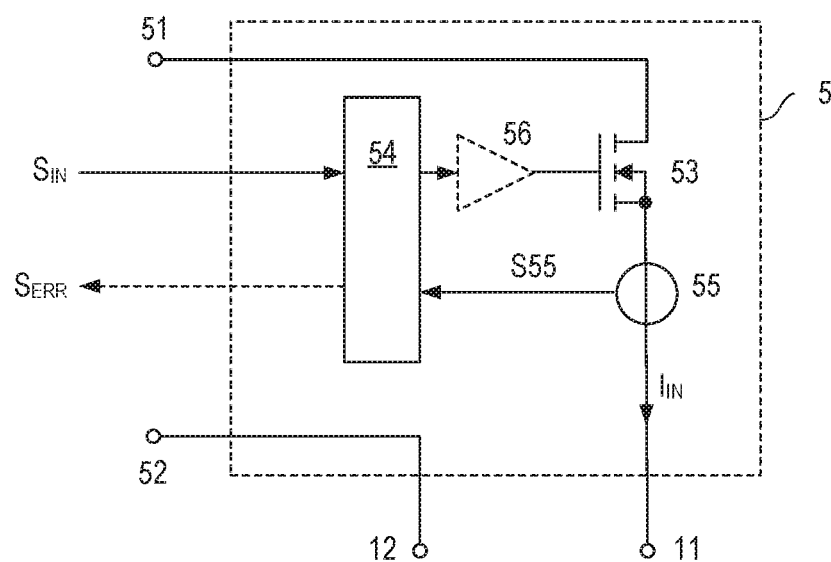
FIG. 17 shows one example of the control circuit in greater detail.

FIG. 17 shows one example of the control circuit 5. In this example, the control circuit 5 includes an electronic switch 53 connected between a first input node 51 of the control circuit 5 and the first input node 11 of the LED circuit (not shown in FIG. 15). Further, a second input node 52 of the control circuit 5 may be connected to the second input node 12 of the LED circuit. The controller 54 receives the input signal $S_{IN}$ and switches on or switches off the electronic switch 53 dependent on the input signal $S_{IN}$. Just for the purpose of illustration, the electronic switch is a MOSFET, more specifically an n-type MOSFET in the example illustrated in FIG. 17. However, any other type of electronic switch may be used as well. Referring to FIG. 17, the control circuit 5 further includes a current measurement circuit 55 configured to measure an input current $I_{IN}$ received by the LED circuit 1. According to one example, the controller 54 receives a current measurement signal S55 that represents the (average) input current $I_{IN}$ and monitors the current measurement signal S55. According to one example, the controller 54 outputs an error signal $S_{ERR}$ based on the current measurement signal S55. According to one example, the controller 54 generates the error signal $S_{ERR}$ such that the error signal $S_{ERR}$ indicates that an error in the LED circuit 1 has occurred when the current measurement signal S55 indicates that the LED circuit 1 is operating in the defect mode. "The LED circuit 1 operating the in the defect mode" means that at least one drive circuit included in the LED circuit 1 operates in the defect mode.

Although the present disclosure is not so limited, the following numbered examples demonstrate one or more aspects of the disclosure.

EXAMPLE 1

An electronic circuit including an LED circuit, wherein the LED circuit includes: an input configured to receive an input voltage; a drive circuit connected to the input; and an LED module connected to the drive circuit and including an LED string with at least one LED, wherein the drive circuit is configured to monitor the LED module for the occurrence of an LED short in the LED string and to change from a normal mode to a defect mode upon detection of the LED short, and wherein the drive circuit is configured, in the defect mode, to operate the LED string in at least one defect cycle that includes deactivating the LED string for a deactivation period, activating the LED string for an activation period, and checking for the persistence of the LED short in the activation period.

EXAMPLE 2

The electronic circuit of example 1, wherein the drive circuit is further configured to change from the defect mode to the normal mode when checking the persistence of the LED short in the activation period reveals that the LED short does not persist.

EXAMPLE 3

The electronic circuit of any combination of examples 1 to 2, wherein a ratio between a duration of the activation period and a duration of the deactivation period in one drive cycle is between 1:10 and 1:100.

EXAMPLE 4

The electronic circuit of any one of any combination of examples 1 to 3, wherein the LED module includes at least one further LED string, and wherein the drive circuit is configured, in the defect mode, to activate the at least one further LED string.

EXAMPLE 5

The electronic circuit of any combination of examples 1 to 4, wherein the LED module includes at least one further LED string, and wherein the drive circuit is configured, in the defect mode, to deactivate the at least one further LED string.

EXAMPLE 6

The electronic circuit of any combination of examples 1 to 5, wherein the LED module includes at least one further LED string, and wherein the drive circuit is configured, in the defect mode, to operate the at least one further LED string in the at least one defect cycle in accordance with the LED string.

EXAMPLE 7

The electronic circuit of any combination of examples 1 to 6, further including: at least one further drive circuit connected to a respective further LED module, wherein the drive circuit is configured to communicate a defect notice indicating the detection of an LED short to the at least one further drive circuit, and wherein the at least one further drive circuit is configured to deactivate the respective LED module connected thereto upon receipt of the defect notice.

EXAMPLE 8

The electronic circuit of any combination of examples 1 to 7, wherein the drive circuit is configured to count the number of defect cycles and deactivate the LED module when a predefined number of failure cycles has been reached.

EXAMPLE 9

The electronic circuit of any combination of examples 1 to 8, further including: a control circuit connected to the input of the LED circuit, configured to receive a supply voltage, and configured to generate the input voltage of the LED circuit based on the supply voltage dependent on an input voltage.

EXAMPLE 10

The electronic circuit of any combination of examples 1 to 9, wherein the control circuit is further configured to monitor an input current received by the LED circuit.

EXAMPLE 11

A method, including: by a drive circuit included in an LED circuit, monitoring an LED module for the occurrence of an LED short in an LED string and changing from a normal mode to a defect mode upon detection of the LED short, in the defect mode of the drive circuit, operating the LED string in at least one defect cycle that includes deactivating the LED string for a deactivation period, activating the LED string for an activation period, and checking for the persistence of the LED short in the activation period.

EXAMPLE 12

The method of claim 11, further including: changing from the defect mode to the normal mode by the drive circuit when checking the persistence of the LED short in the activation period reveals that the LED short does not persist.

EXAMPLE 13

The method of any combination of examples 11 to 12, wherein a ratio between a duration of the activation period and a duration of the deactivation period in one drive cycle is between 1:10 and 1:100.

EXAMPLE 14

The method of any combination of examples 11 to 13, wherein the LED module includes at least one further LED string, and wherein the method further includes activating the at least one further LED string by the drive circuit in the defect mode.

EXAMPLE 15

The method of any combination of examples 11 to 14, wherein the LED module includes at least one further LED string, and wherein the method further includes deactivating the at least one further LED string by the drive circuit in the defect mode.

EXAMPLE 16

The method of any combination of examples 11 to 15, wherein the LED module includes at least one further LED string, and wherein the method further includes, by the drive circuit in the defect mode, operating the at least one further LED string in the at least one defect cycle in accordance with the LED string.

EXAMPLE 17

The method of any combination of examples 11 to 16, further including: communicating a defect notice indicating the detection of an LED short by the drive circuit to at least one further drive circuit connected to a respective further LED module, deactivating the respective LED module connected thereto by the at least one further drive circuit upon receipt of the defect notice.

EXAMPLE 18

The method of any combination of examples 11 to 17, further including: by the drive circuit, counting a number of defect cycles and deactivating the LED module when a predefined number of failure cycles has been reached.

EXAMPLE 19

The method of any combination of examples 11 to 18, further including: providing an input voltage to the LED circuit based on a supply voltage and dependent on an input voltage by a control circuit.

EXAMPLE 20

The method of any combination of examples 11 to 19, further including: by the control circuit, monitoring an input current received by the LED circuit.

While the invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

The invention claimed is:

1. An electronic circuit comprising a light emitting diode (LED) circuit, wherein the LED circuit comprises:
   an input configured to receive an input voltage;
   a drive circuit connected to the input; and
   an LED module connected to the drive circuit and comprising an LED string with at least one LED,
   wherein the drive circuit is configured to monitor the LED module for an occurrence of an LED short in the LED string and to change from a normal mode to a defect mode upon detection of the LED short,
   wherein the drive circuit is configured, in the defect mode, to operate the LED string in at least one defect cycle that includes deactivating the LED string for a deactivation period, activating the LED string for an activation period, and checking for persistence of the LED short in the activation period, and
   wherein a ratio between a duration of the activation period and a duration of the deactivation period in one defect cycle is between 1:10 and 1:100.

2. The electronic circuit of claim 1, wherein the drive circuit is further configured to change from the defect mode to the normal mode when checking the persistence of the LED short in the activation period reveals that the LED short does not persist.

3. The electronic circuit of claim 1,
   wherein the LED module comprises at least one further LED string, and
   wherein the drive circuit is configured, in the defect mode, to activate the at least one further LED string.

4. The electronic circuit of claim 1,
   wherein the LED module comprises at least one further LED string, and
   wherein the drive circuit is configured, in the defect mode, to deactivate the at least one further LED string.

5. The electronic circuit of claim 1,
   wherein the LED module comprises at least one further LED string, and
   wherein the drive circuit is configured, in the defect mode, to operate the at least one further LED string in the at least one defect cycle in accordance with the LED string.

6. The electronic circuit of claim 1, further comprising:
   at least one further drive circuit connected to a further LED module,
   wherein the drive circuit is configured to communicate a defect notice indicating the detection of an LED short to the at least one further drive circuit, and
   wherein the at least one further drive circuit is configured to deactivate the further LED module connected thereto upon receipt of the defect notice.

7. The electronic circuit of claim 1, wherein the drive circuit is configured to count the number of defect cycles and deactivate the LED module when a predefined number of defect cycles has been reached.

8. The electronic circuit of claim 1, wherein the input voltage is a first input voltage, further comprising:
   a control circuit connected to the input of the LED circuit, configured to receive a supply voltage, and configured to generate the first input voltage of the LED circuit based on the supply voltage dependent on a second input voltage.

9. The electronic circuit of claim 5, wherein the control circuit is further configured to monitor an input current received by the LED circuit.

10. A method, comprising:
    by a drive circuit included in a light emitting diode (LED) circuit, monitoring an LED module for an occurrence of an LED short in an LED string and changing from a normal mode to a defect mode upon detection of the LED short, and
    in the defect mode of the drive circuit, operating the LED string in at least one defect cycle that includes deactivating the LED string for a deactivation period, activating the LED string for an activation period, and checking for persistence of the LED short in the activation period, wherein a ratio between a duration of the activation period and a duration of the deactivation period in one defect cycle is between 1:10 and 1:100.

11. The method of claim 10, further comprising:
    changing from the defect mode to the normal mode by the drive circuit when checking the persistence of the LED short in the activation period reveals that the LED short does not persist.

12. The method of claim 10,
    wherein the LED module comprises at least one further LED string, and
    wherein the method further comprises activating the at least one further LED string by the drive circuit in the defect mode.

13. The method of claim 10,
    wherein the LED module comprises at least one further LED string, and
    wherein the method further comprises deactivating the at least one further LED string by the drive circuit in the defect mode.

14. The method of claim 10,
    wherein the LED module comprises at least one further LED string, and
    wherein the method further comprises, by the drive circuit in the defect mode, operating the at least one further LED string in the at least one defect cycle in accordance with the LED string.

15. The method of claim 10, further comprising:
communicating a defect notice indicating the detection of the LED short by the drive circuit to at least one further drive circuit connected to a further LED module, deactivating the further LED module connected thereto by the at least one further drive circuit upon receipt of the defect notice.

16. The method of claim 10, further comprising:
by the drive circuit, counting a number of defect cycles and deactivating the LED module when a predefined number of defect cycles has been reached.

17. The method claim 10, further comprising:
providing a first input voltage to the LED circuit based on a supply voltage and dependent on a second input voltage by a control circuit.

18. The method of claim 17, further comprising:
by the control circuit, monitoring an input current received by the LED circuit.

19. A drive circuit is configured to monitor an LED module for an occurrence of an LED short in an LED string and to change from a normal mode to a defect mode upon detection of the LED short, wherein the drive circuit is configured, in the defect mode, to operate the LED string in at least one defect cycle that includes deactivating the LED string for a deactivation period, activating the LED string for an activation period, and checking for persistence of the LED short in the activation period, and wherein a ratio between a duration of the activation period and a duration of the deactivation period in one defect cycle is between 1:10 and 1:100.

20. The drive circuit of claim 19, wherein the drive circuit is further configured to change from the defect mode to the normal mode when checking the persistence of the LED short in the activation period reveals that the LED short does not persist.

21. The drive circuit of claim 19, wherein the LED string comprises a plurality of LEDs.

22. The electronic circuit of claim 1, wherein the LED string comprises a plurality of LEDs.

* * * * *